H. M. GORSLINE.
JOINT LOCK FOR FRAME STRUCTURES.
APPLICATION FILED JUNE 1, 1920.

1,356,062.

Patented Oct. 19, 1920.
3 SHEETS—SHEET 1.

INVENTOR.
Hathaway M. Gorsline
BY
George J. Oltsch
ATTORNEY.

H. M. GORSLINE.
JOINT LOCK FOR FRAME STRUCTURES.
APPLICATION FILED JUNE 1, 1920.

1,356,062.

Patented Oct. 19, 1920.
3 SHEETS—SHEET 3.

INVENTOR.
Hathaway M. Gorsline
BY
George J. Otsch
ATTORNEY.

UNITED STATES PATENT OFFICE.

HATHAWAY M. GORSLINE, OF NILES, MICHIGAN.

JOINT-LOCK FOR FRAME STRUCTURES.

1,356,062.  Specification of Letters Patent.  Patented Oct. 19, 1920.

Application filed June 1, 1920. Serial No. 385,769.

*To all whom it may concern:*

Be it known that I, HATHAWAY M. GORSLINE, a citizen of the United States, residing at Niles, in the county of Berrien and State of Michigan, have invented certain new and useful Improvements in Lock-Joints for Frame Structures, of which the following is a specification.

My invention relates to a lock joint more particularly adapted for use in joining the members of a frame structure made up of angle bars, such as joining the members at the corners and in endwise relation, whereby the members may be easily and expeditiously assembled and locked together without the employment of separate fastening devices.

The object of the invention resides in the provision of means for effecting a lock joint which will be highly efficient for obtaining rigidity of structure between connected frame members, such as in the building of show cases, counters, and the like, and which joint is particularly adapted for use in connection with frame members consisting of angle bars of L and U section to obtain great strength with a minimum of weight. Structural members of such type do not readily lend themselves to a formation at their ends adapted for interlocking connection having the required security and rigidity without the employment of relatively massive and heavy castings for the coupling members, and the present invention is directed to the abolishment of such heavy castings by the provision of substitute means of relatively light weight and simple means to effect the lock joint, whereby the frame structure, though of light weight and simple construction, will possess great strength and rigidity, with the resultant advantage of a saving in the cost of materials and manufacture.

With the above and other objects in view, the invention in the preferred form of details will be described in the following specification, reference being had particularly to the accompanying drawings, in which:

Figure 1 is a perspective view of a frame structure embodying the improved lock joint for coupling the parts.

Figure 1:
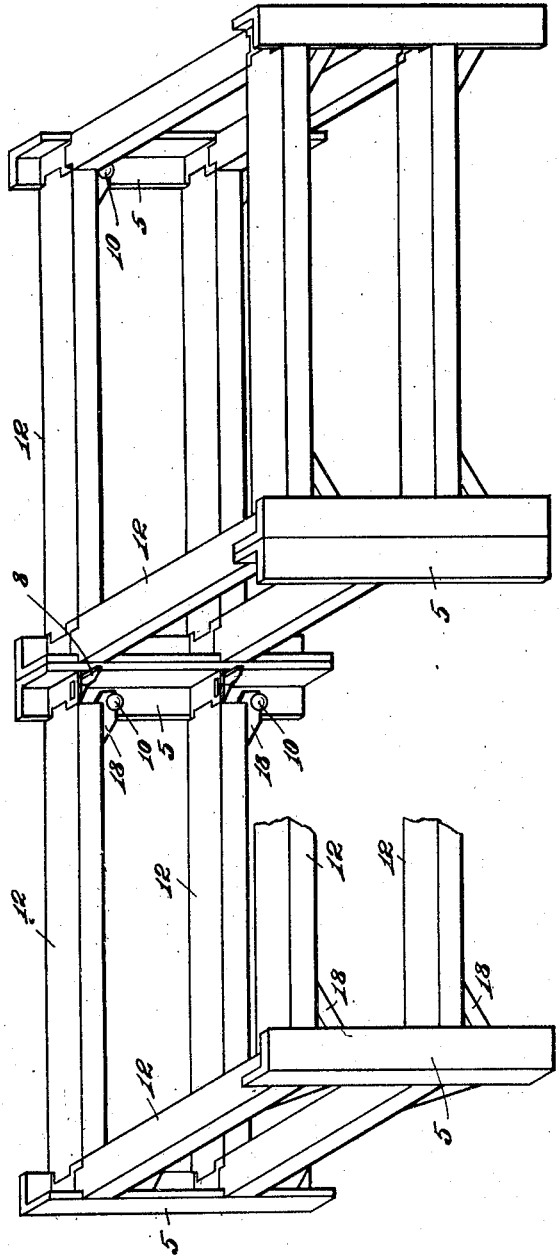
Figure 2:
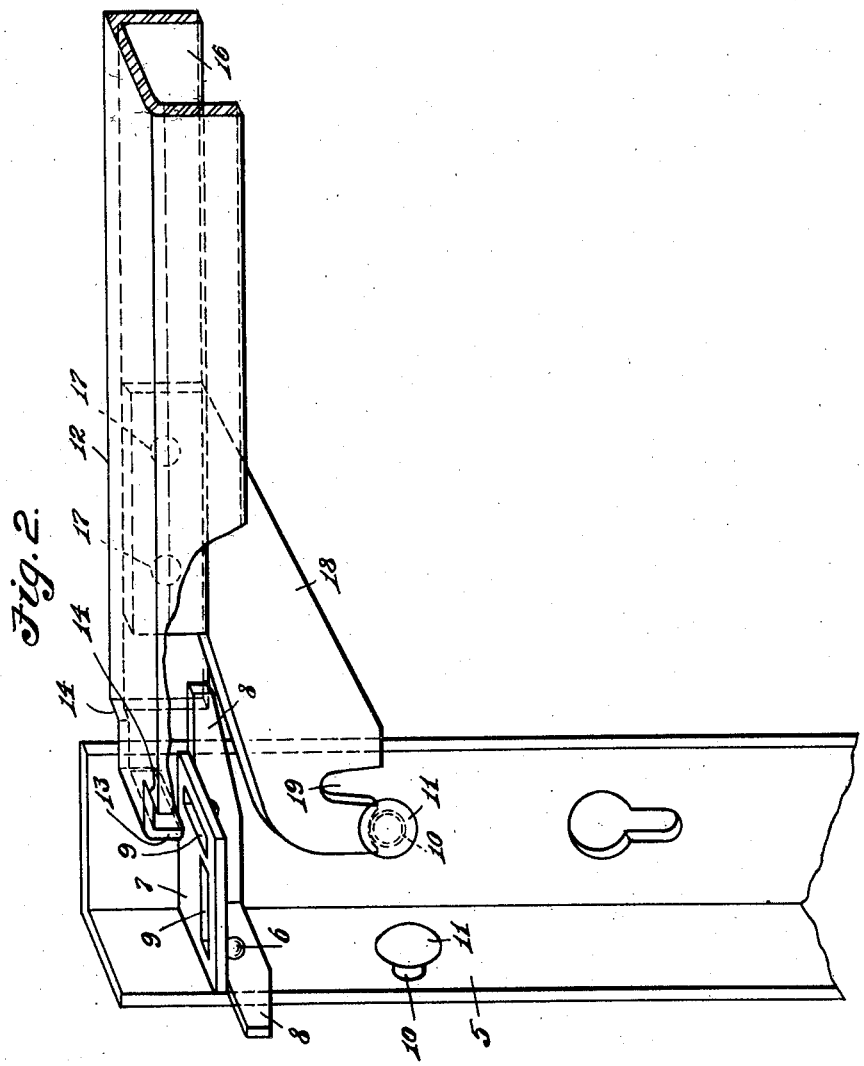
Fig. 2 is a perspective view, partly in section, of a corner post and side bar, showing the relation of the parts immediately preceding the coupling operation.

To permit the joining of the angle irons or bars constituting the corner uprights and side bars of the frame in a secure and rigid manner, as well as to permit the easy disjointing of the parts to disassemble the frame, I employ means for locking the parts together which are either integrally formed with or permanently fixed to the respective frame members, so that the parts can be easily assembled by unskilled persons. In order to obtain both lightness of weight and strength, I prefer to employ for the corner posts of the frame, angle bars 5, and to which, within the corner formed by the angles thereof, there is suitably secured, as by means of rivets 6, a bracket member 7 which preferably has the cleat portions 8 integrally formed therewith, and which cleats serve as a means for securing the bracket to place by means of said rivets, and for purposes which will presently appear are extended beyond the edges of the angle bar or upright 5. The bracket 7 may consist of a light casting or stamping, and is provided with slot openings 9. Suitably secured to the respective flanges of the upright, and at a distance below the bracket 7, and extending inwardly of the flanges, are studs 10 provided with head portions 11.

The side bars or rails 12 of the frame, both side and end bars being hereinafter referred to as side bars to simplify description, consist preferably of channel iron, and which are terminally reduced in width to permit formation of a depending lug or hook 13 adapted to engage one of the slots 9 in the bracket 7, and to provide shoulders or offset portions 14, the outer of which is adapted to abut the edge of upright, as does the end 15 of the outer flange, when the parts are in locked relation. Secured to the inner side of the outer flange 16 of the side bar, as by means of rivets 17, and adjacent the end of said bar, is a downwardly and forwardly extending arm 18, preferably of heavy gage sheet iron, and which arm is provided with an open-ended slot 19, adapted to straddle the stud 10, as shown in Fig. 3, when the parts are set in locked position.

Figure 3:
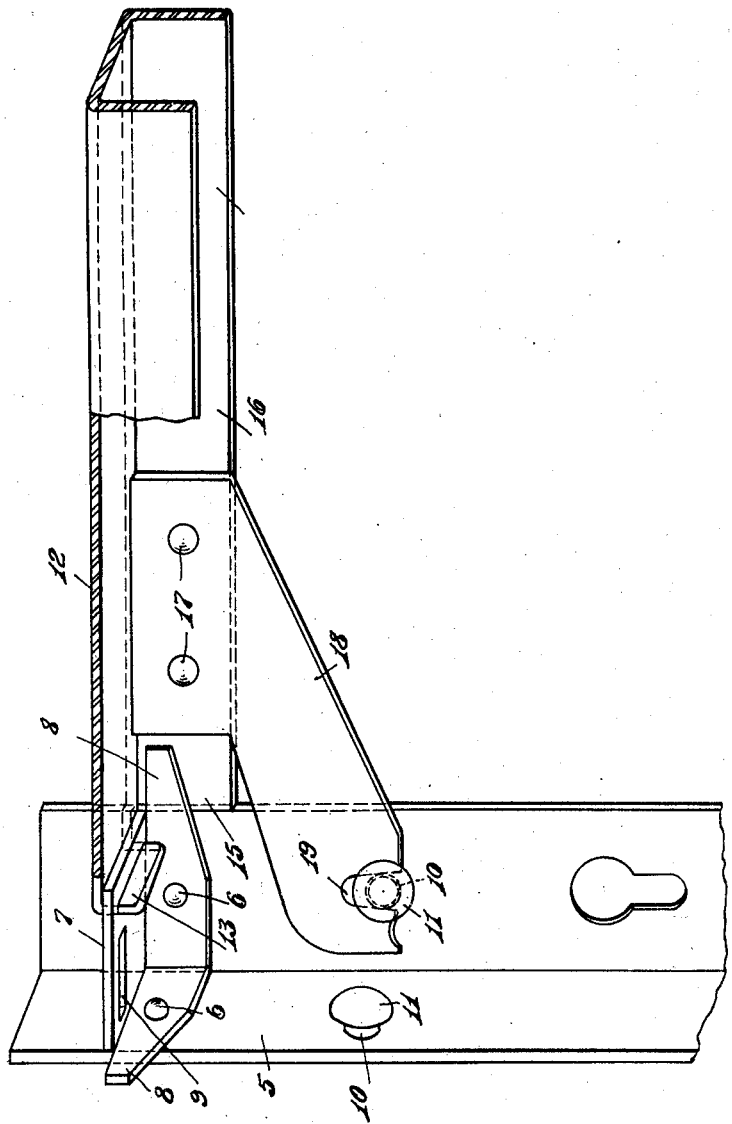
Fig. 3 is a similar view showing the parts in coupled relation.

It will be seen by reference to Fig. 3, in which the parts are shown in coupled relation, that the hook 13, in its engagement with the slot 9, due to the considerable width thereof, holds the upright against any turning movement in a horizontal plane, and which tendency is further restrained by the cleat 8 abutting the inner side of the outer flange of the side bar, and the arm 18 overlapping and sidewise abutting the inner side of the flange of the upright. The arm 18 further prevents turning movement of the side bar in either direction through its connection with the stud 10, the head portion of which prevents inward turning movement of the bar, and the flange of the upright prevents turning movement thereof in the reverse direction. The lock joint is thus effected by means of very simple form, and of parts which need not be of any thicker gage than that of the upright and side angle bars, which by their particular form and mode of interengagement provide a secure and rigid locking engagement between the parts.

While the foregoing is the preferred form of my invention, I desire it to be understood that I do not limit myself to the precise structure shown and described, as it is obvious that the same may be variously modified without departing from the spirit of the invention as defined by the claims.

What is claimed is:

1. A lock joint for frame structures including an upright angle bar, a fixed bracket thereon having slots therein arranged at relatively right angles, studs projecting inwardly of the bar below said bracket, and side angle bars terminally provided with hook members adapted to engage said slots, and with flat edgewise depending arms having an open-ended slot adapted to straddle said studs and to sidewise abut the sides of the upright bar flanges.

2. A lock joint for frame structures including an upright angle bar, a fixed bracket thereon having slot holes therein and arms extending beyond the side edges of the bar, studs on the bar below said bracket projected inwardly thereof, side bars terminally formed with depending hook members adapted to engage said slots, and flat edgewise disposed arms extending from said side bars adapted to straddle said studs, said arms sidewise abutting the upright bar and the bracket arms sidewise abutting the side bars.

3. A lock joint for frame structures including an upright angle bar, a fixed transverse bracket thereon having a slot hole therein, a headed stud on the bar projecting inwardly thereof below said bracket, a side bar terminally formed with a broad transverse depending hook member adapted to engage said slot, and a flat edgewise disposed arm depending from the side bar having a terminal hook formation adapted to straddle said stud and to be held in close sidewise abutment with the upright bar and with the head portion of said stud.

In testimony whereof I affix my signature.

HATHAWAY M. GORSLINE.